US012002317B2

(12) United States Patent
Clark

(10) Patent No.: US 12,002,317 B2
(45) Date of Patent: Jun. 4, 2024

(54) SYSTEMS AND METHODS FOR SECURING LICENSE PLATES

(71) Applicant: Craig Clark, Hudson, NH (US)

(72) Inventor: Craig Clark, Hudson, NH (US)

( * ) Notice: Subject to any disclaimer, the term of this patent is extended or adjusted under 35 U.S.C. 154(b) by 319 days.

(21) Appl. No.: 17/673,432

(22) Filed: Feb. 16, 2022

(65) Prior Publication Data

US 2023/0260352 A1 Aug. 17, 2023

(51) Int. Cl.

| | |
|---|---|
| ***G07C 9/37*** | (2020.01) |
| ***E05B 17/10*** | (2006.01) |
| ***E05B 41/00*** | (2006.01) |
| ***E05B 47/00*** | (2006.01) |
| ***G07C 9/38*** | (2020.01) |

(52) U.S. Cl.

CPC ................ *G07C 9/37* (2020.01); *E05B 17/10* (2013.01); *E05B 41/00* (2013.01); *E05B 47/0002* (2013.01); *G07C 9/38* (2020.01); *E05B 2047/0067* (2013.01)

(58) Field of Classification Search

CPC .. G07C 9/37; G07C 9/38; E05B 17/10; E05B 41/00; E05B 47/0002; E05B 2047/0067; E05B 73/0023; E05B 73/00; A47F 7/024; B60Q 1/00

USPC ......... 109/24.1; 211/4, 8, 10, 26, 26.1, 26.2, 211/41.1, 55, 71.01, 72, 83

See application file for complete search history.

(56) References Cited

U.S. PATENT DOCUMENTS

| | | | | |
|---|---|---|---|---|
| 2,889,050 A * | 6/1959 | Modrey | A47G 29/10 | 211/85.9 |
| 4,337,987 A * | 7/1982 | Brooks | E05B 11/04 | 70/389 |
| 4,724,689 A | 2/1988 | Anchia | | |
| 5,012,602 A * | 5/1991 | Storey | G09F 7/18 | 40/201 |
| 5,020,347 A * | 6/1991 | Logan | E05B 35/086 | 70/389 |
| 5,659,986 A | 8/1997 | Simmons | | |
| 5,803,526 A * | 9/1998 | Rohrberg | B60Q 1/56 | 296/76 |
| 5,896,685 A * | 4/1999 | McCall | B60R 13/105 | 40/202 |
| 6,305,107 B1 * | 10/2001 | Parenti | B60R 13/105 | 40/201 |
| 6,481,126 B2 * | 11/2002 | Paulhill | B60R 13/105 | 70/DIG. 57 |
| 6,598,742 B1 | 7/2003 | Belden, Jr. | | |
| 6,666,330 B2 | 12/2003 | Sedon | | |

(Continued)

FOREIGN PATENT DOCUMENTS

| | | |
|---|---|---|
| EP | 0 483 422 A1 | 10/1990 |
| EP | 0 942 135 B2 | 1/2008 |

(Continued)

*Primary Examiner* — Suzanne L Barrett

(74) *Attorney, Agent, or Firm* — Lambert Shortell & Connaughton; David J. Connaughton, Jr.; Justin P. Tinger

(57) ABSTRACT

Improved systems and methods for securing license plates are disclosed herein. In the preferred embodiments discussed, the systems and methods are applied to the securing of dealer license plates. There are numerous problems with the unauthorized or illegal use of these types of license plates, and the machine and software combination disclosed herein may provide solutions to at least some of these problems.

20 Claims, 6 Drawing Sheets

(56) References Cited

U.S. PATENT DOCUMENTS

| | | | | |
|---|---|---|---|---|
| 6,892,483 | B2 * | 5/2005 | Parenti | B60R 13/105 40/201 |
| 7,116,228 | B1 * | 10/2006 | Singleton | G06Q 10/087 340/568.1 |
| 7,281,398 | B1 * | 10/2007 | Sims | A63B 55/40 70/64 |
| 7,415,787 | B2 * | 8/2008 | Eidsmore | B60R 13/105 40/201 |
| 7,535,343 | B1 * | 5/2009 | Pinckney | G09F 21/04 40/575 |
| 7,581,418 | B2 | 9/2009 | Sedon | |
| 8,661,864 | B1 * | 3/2014 | Guessford | E05B 35/086 70/389 |
| 8,695,243 | B1 * | 4/2014 | Aldasem | G09F 7/02 40/209 |
| 10,814,833 | B1 * | 10/2020 | Goetzinger | B60R 25/23 |
| 11,779,110 | B2 * | 10/2023 | Lattimore | A47G 29/08 211/85.3 |
| 2005/0110609 | A1 * | 5/2005 | Mosgrove | G07C 9/27 340/5.72 |
| 2007/0157495 | A1 * | 7/2007 | Yang | B60R 13/105 40/201 |
| 2007/0290799 | A1 * | 12/2007 | Harkins | G07C 9/00571 340/5.5 |
| 2012/0068492 | A1 * | 3/2012 | Lucas | B60R 7/02 296/37.1 |
| 2012/0228243 | A1 * | 9/2012 | Crigger | G07C 9/37 211/64 |
| 2021/0385278 | A1 * | 12/2021 | Binder | H04L 67/12 |

FOREIGN PATENT DOCUMENTS

| | | | | |
|---|---|---|---|---|
| WO | WO-9624283 | A2 * | 8/1996 | F41A 17/066 |
| WO | WO-2008055364 | A1 * | 5/2008 | E05G 1/06 |

* cited by examiner

SYSTEMS AND METHODS FOR SECURING LICENSE PLATES

BACKGROUND

Technical Field

The present disclosure relates generally to systems and methods for securing dealer plates. More particularly, the present disclosure relates to a system and method for ensuring that dealer plates are physically locked behind a check requiring biometric verification for access to said plates.

Description of Related Art

As opposed to regular license plates for registered motor vehicles, dealer license plates are typically placed on vehicles that are being used by an owner, officer, employee, or by customers of a dealership that are test driving one of the vehicles. Every state in the country has laws or regulations that essentially restrict the usage of dealer plates to this situation. For example, in almost every state a dealer plate being placed on a vehicle is an indication that said vehicle is being held for resale by a dealer. Accordingly, dealer plates being used on vehicles that are not intended to be sold, such as for personal use, enable the user of the vehicle to avoid payment of sales taxes on the vehicle.

If a dealer plate is being used in an illegal way that is either authorized or unauthorized by the dealership, the owner of the dealership could face civil or criminal liability, depending on the severity of the violation. In addition to this problem, there many other problems related to the incorrect or unauthorized use of dealer plates. There are several potential solutions to these problems, but the consistency of the results of such solutions are unpredictable.

Therefore, what is needed are systems and methods of securing dealer plates having the following characteristics and benefits over the prior art.

SUMMARY

The subject matter of this application may involve, in some cases, interrelated products, alternative solutions to a particular problem, and/or a plurality of different uses of a single system or article.

In one aspect, a system for securing an item is disclosed. In this aspect, a control box, a plate box, and a locking mechanism are utilized. The control box is connected to the plate box, and the plate box comprises a plate door, which is connected to the plate box. The front face of the plate door defines a slot of the placing of an item, and the rear face of the plate door comprises the locking mechanism, which is operable to reciprocally lock and unlock the item placed in the slot.

In another aspect, a system for securing a license plate is disclosed. In this aspect, a system server, a control box, a plate box, a locking mechanism, a processor, and a non-transitory computer readable medium are utilized. In this aspect, the control box is in networked communication with the system server, and the control box connected to the plate box by either a wired or wireless connection. In this aspect, the plate box also comprises a plate door which is connected to the plate box. The front face of the plate door defines a slot for the placement of a license plate, and the rear face of the plate door comprises the locking mechanism, which is operable to reciprocally lock and unlock the license plate placed in the slot. The non-transitory computer readable medium is configured to store instructions which are executable by the processor to conduct the steps of: (1) receiving user biometric information from the control box, and (2) saving the user biometric information in the non-transitory computer readable medium or a database stored on the system server.

In yet another aspect, a method for securing license plates is disclosed. The method begins with the step of providing a system which utilizes a control box, a plate box, and a locking mechanism. In this aspect, the control box comprises a touch screen and a fingerprint sensor attached to the control box. Also, in this aspect, the plate box is connected to the control box, and the plate box comprises a plate door having a slot for the placement of a license plate. The locking mechanism is associated with the slot on the plate door and is operable to reciprocally lock and unlock the license plate placed in the slot. The method comprises the steps of (1) scanning a thumb or a finger on the fingerprint sensor attached to the control box, and (2) removing the license plate from the slot.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

Figure 1:
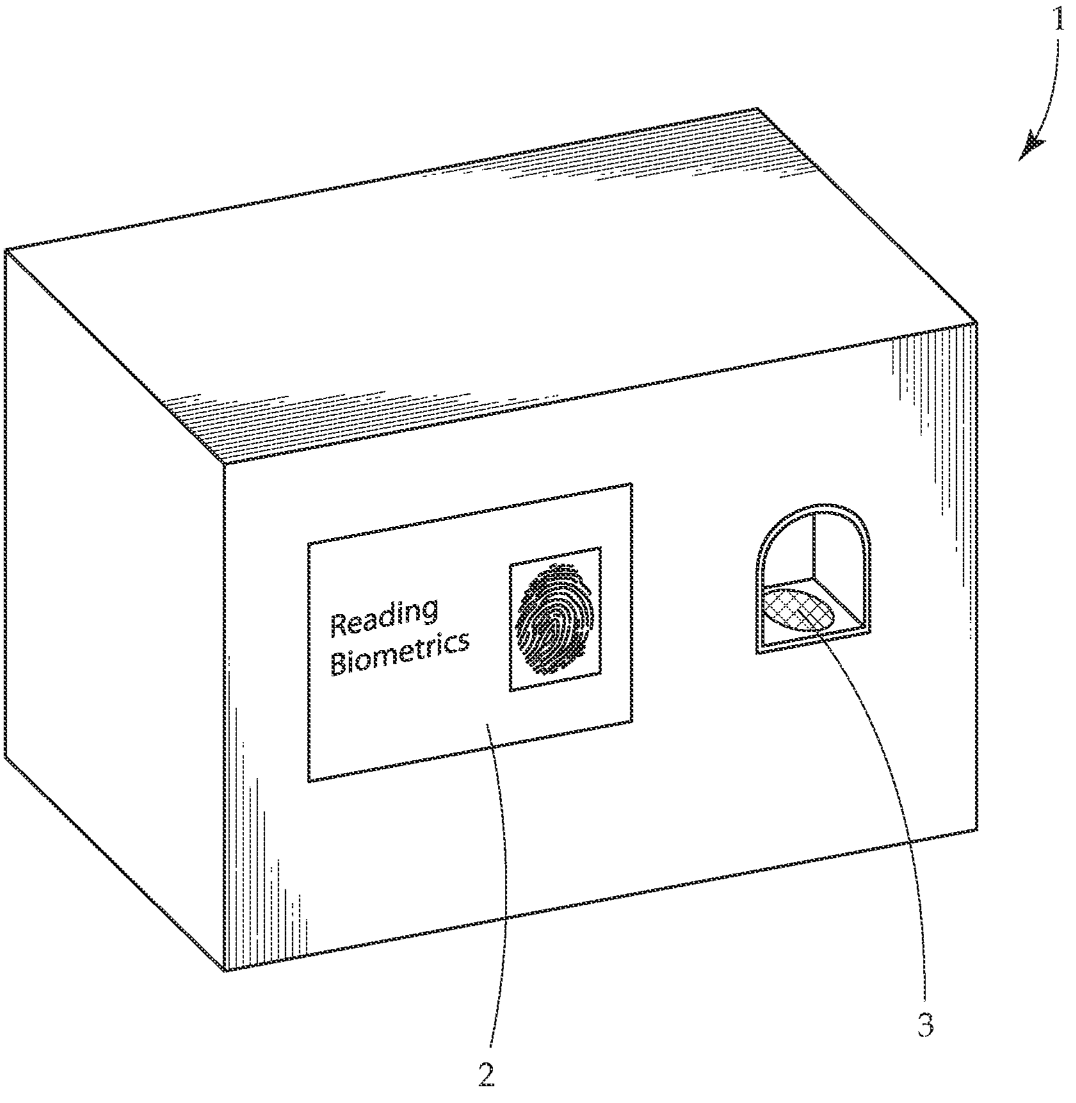
FIG. 1 provides a perspective view of an embodiment of a control box according to the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence steps for constructing and operating the invention in connection with the illustrated embodiments.

Generally, the present disclosure concerns new and improved systems and methods for securing dealer license plates, or "dealer plates" for short. As previously discussed, there are numerous problems with the unauthorized or illegal use of dealer plates, and the systems and methods disclosed herein may provide solutions to at least some or these problems. For example, in most embodiments, the system for securing dealer plates may utilize a plate box that may ensure every dealer plate is physically locked behind a biometric check until the plates are to be used. When one of the plates is to be used, the plate box may unlock the plate, and the system may simultaneously log the interaction in a database. Similarly, when one of the plates is to be returned, the plate box may lock the plate, and the system may, again, simultaneously create and save another log for the interaction in the database. In general, the system may account for who is in possession of any plate at any given time, and the system may also be operable to send notifications to a user if a plate is not returned on time.

In most embodiments, the system may accomplish its goals by utilizing a non-transitory computer readable medium or memory having instructions allowing and instructing a data processor to carry out the steps required for the system to operate as described herein. This non-transitory computer readable medium may be stored within a computer or other similar devices that utilize processors, such as mobile devices. The non-transitory computer readable medium may also be accessible through a wired or wireless electronic communication system, such as a network or Internet connection. For example, in most embodiments, the logs that record interactions with the dealer plates or the plate box may be stored in the memory of a computer, and a computerized network connection may connect the memory and the processor of the computer to the internet. This may allow the stored logs to be accessible through an internet website or a mobile application.

In some embodiments, the system may utilize a control box in wired or wireless networked communication with the system. The control box may also be in wired or wireless connection with a plate box or several plate boxes, which may house one or more dealer plates. The control box may provide a graphical user interface, which may allow users of the system to select a plate to be removed from the plate box. In some embodiments, the graphical user interface may also prompt user requesting the removal of a dealer plate to input the reason for removal. In order for a dealer plate to be removed, a user may be required to first register biometric information with the system. In some embodiments, the user's biometric information may be a fingerprint of a thumb or finger, which may be scanned and saved in the system by a fingerprint sensor attached to the control box. After a user's fingerprint is registered, the user may unlock and remove a dealer plate from the plate box by scanning their thumb or finger on the fingerprint sensor.

In most embodiments, the plate box may comprise a plate door having a plurality of slots for housing dealer plates on a front face of the door. In some embodiments, the slots for the dealer plates may be inclined recesses to allow the dealer plates to be housed at an angle for ease of handling. Furthermore, in some embodiments, each one of the plurality of slots may have a light emitting diode ("LED") indicator corresponding to it, which may indicate the status of the dealer plate in the slot. For example, in some embodiments, the LED indicators may glow green when the plates are unlocked and red when the plates are locked. In most embodiments, the plate box may comprise a plurality of locking mechanisms on the rear face of the plate door for locking and unlocking the dealer plates. In some instances, manual access to the locking mechanisms on the rear face of the plate door may be required, such as for example, to conduct maintenance on one of the locking mechanisms. Accordingly, in some embodiments, the plate door may also comprise a mechanical lock on the front face of the plate door that may unlock the plate door with a key.

Turning now to FIG. 1, which provides a perspective view on an embodiment of a control box 1. In this embodiment, the control box 1 provides a graphical user interface for users to interact with the system by way of a touch screen 2 operable to receive user inputs. The touch screen 2 is connected to the control box 1, and the touch screen 2 also connects the control box 1 to the system. In this embodiment, the touch screen 2 connects the control box 1 to the system via an ethernet port which establishes a computerized network connection between the system servers and the control box 1. In this embodiment, the control box 1 also provides a fingerprint sensor 3 connected to the touch screen 2, which allows users to register their fingerprints with the system.

Figure 2:
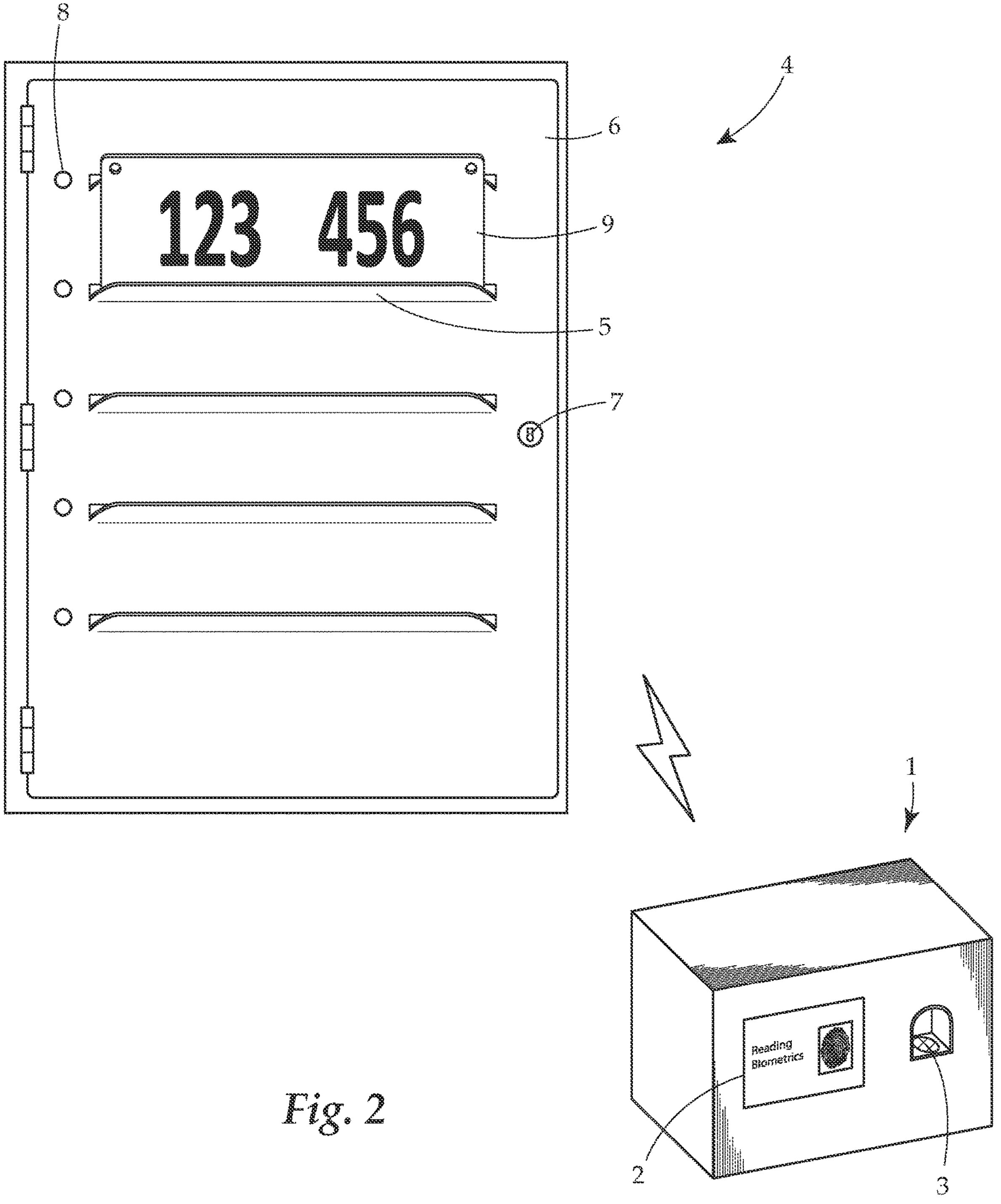
FIG. 2 provides a perspective view of an embodiment of a plate box connected to a control box according to the present disclosure.
Figure 3:
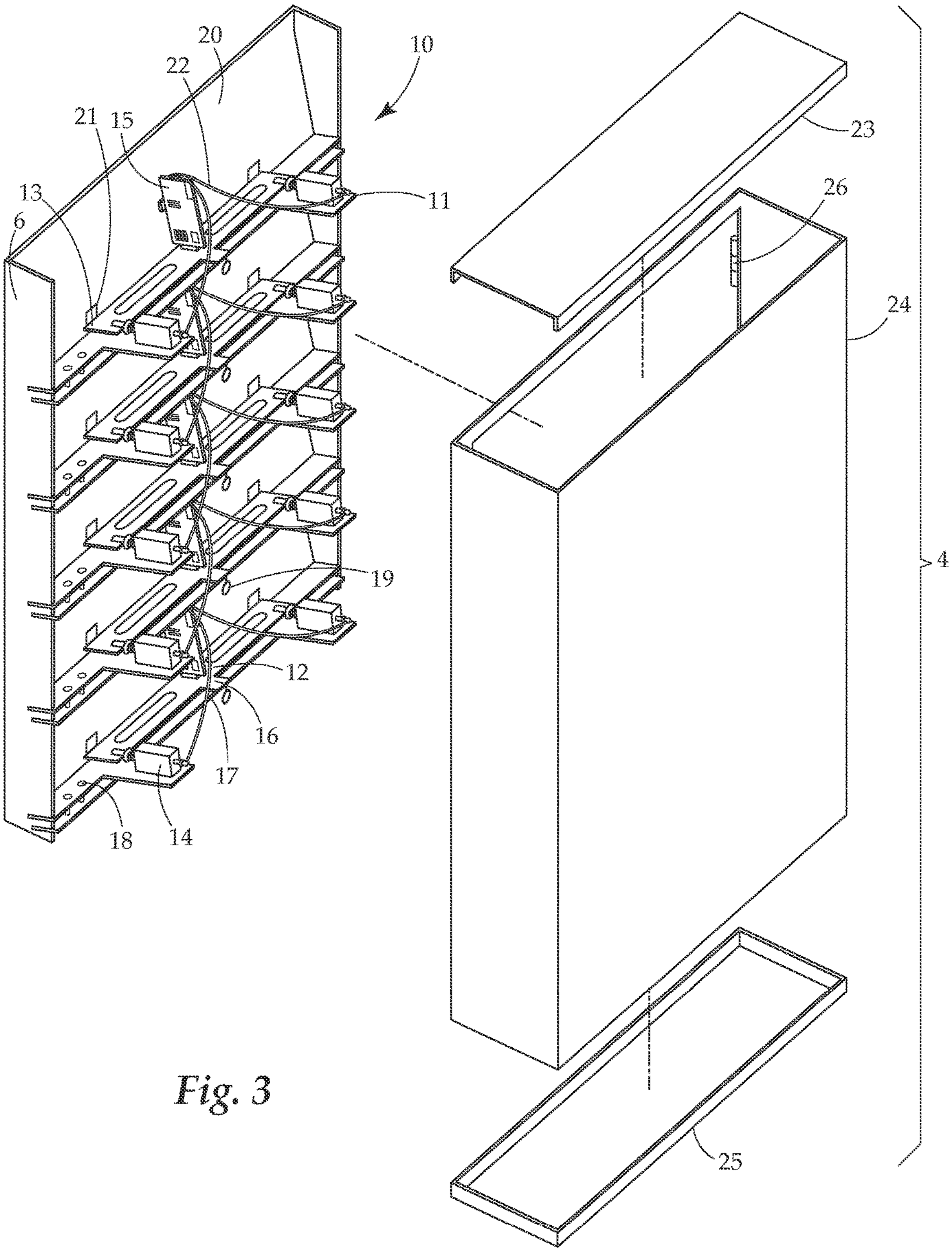
FIG. 3 provides a partially exploded perspective view of an embodiment of a plate box according to the present disclosure.

As shown in FIG. 2, once a user's fingerprints are registered with the system, the fingerprint sensor 3 will allow the user to access a dealer plate 9 housed in the plate box 4 through a connection between the control box 1 and the plate box 4. In this embodiment, the control box 1 is connected to the plate box 4 through a wireless connection between the touch screen 2 and at least one plate locking mechanism 10 attached to the rear face of the plate door 6, as shown in FIG. 3. While a wireless connection is used to connect to the control box 1 to the plate box 4 in this embodiment, a wired connection may be utilized in other embodiments.

Next, and still referring to FIG. 2, the plate box 4 comprises a plurality of slots 5 on the front face of the plate door 6 for the housing of dealer plates 9. The front face of the plate door 6 also comprises a plurality of LED indicators 8, which, in this embodiment, are connected to the plurality of locking mechanisms 10 on the rear face of the plate door 6 by wires 22. The LED indicators 8 change colors based on the status of a dealer plate 9 in a corresponding slot 5. For example, in this embodiment, when the dealer plate 9 in the slot 5 is locked, the LED indicator 8 associated with the slot 5 will glow green. Conversely, when the dealer plate 9 in the slot 5 is unlocked, the LED indicator 8 associated with the slot 5 will glow red. The plate door 6 also comprises a mechanical lock 7, which may be unlocked with a key for manual access to the locking mechanisms 10 on the rear face of the plate door 6.

Turning now to FIG. 3, which shows a partially exploded perspective view of the plate box 4. In this embodiment, the plate box 4 is made by combining a top piece 23, a middle piece 24, a bottom piece 25, and a plate door 6. The plate door 6 is attached to the middle piece 24 of the plate box 4 by hinges 26, which allow the door to swing open and close. Furthermore, in this embodiment, the rear face of the plate door 6 comprises a plurality of locking mechanisms 10. Each locking mechanism 10 is supported by a platform 11, and each platform 11 is connected to a plate floor 17 by supporting screws or bolts 18. Each plate floor 17 supports a dealer plate 9 housed in a corresponding slot 5 on the front face of the plate door 6, as shown in FIG. 2, and each locking mechanism 10 is responsible for the locking and unlocking the dealer plate 9 housed in the slot 5.

In this embodiment, and still referring to FIG. 3, each locking mechanism 10 comprises two solenoid actuators 14, which are mechanically connected to a locking jig 12 and electrically connected to a sensor array 15 by wires 22. The locking jig 12 comprises two locking pins 13, which penetrate through two apertures 21 in a first support sheet 20 when the locking jig 12 is extended in a locked position. When each locking mechanism 10 is functioning correctly, an electric voltage being applied to the solenoid actuators 14 will cause the locking jig 12 to retract to an unlocked position. However, in some circumstances, manual unlocking of the locking jig 12 may be needed. Accordingly, this embodiment comprises a pull 16 integrally formed into the structure of the locking jig 12, and the pull 16 has a pull ring 19 attached to it in order to facilitate manual unlocking by a user's thumb or finger.

Figure 4:
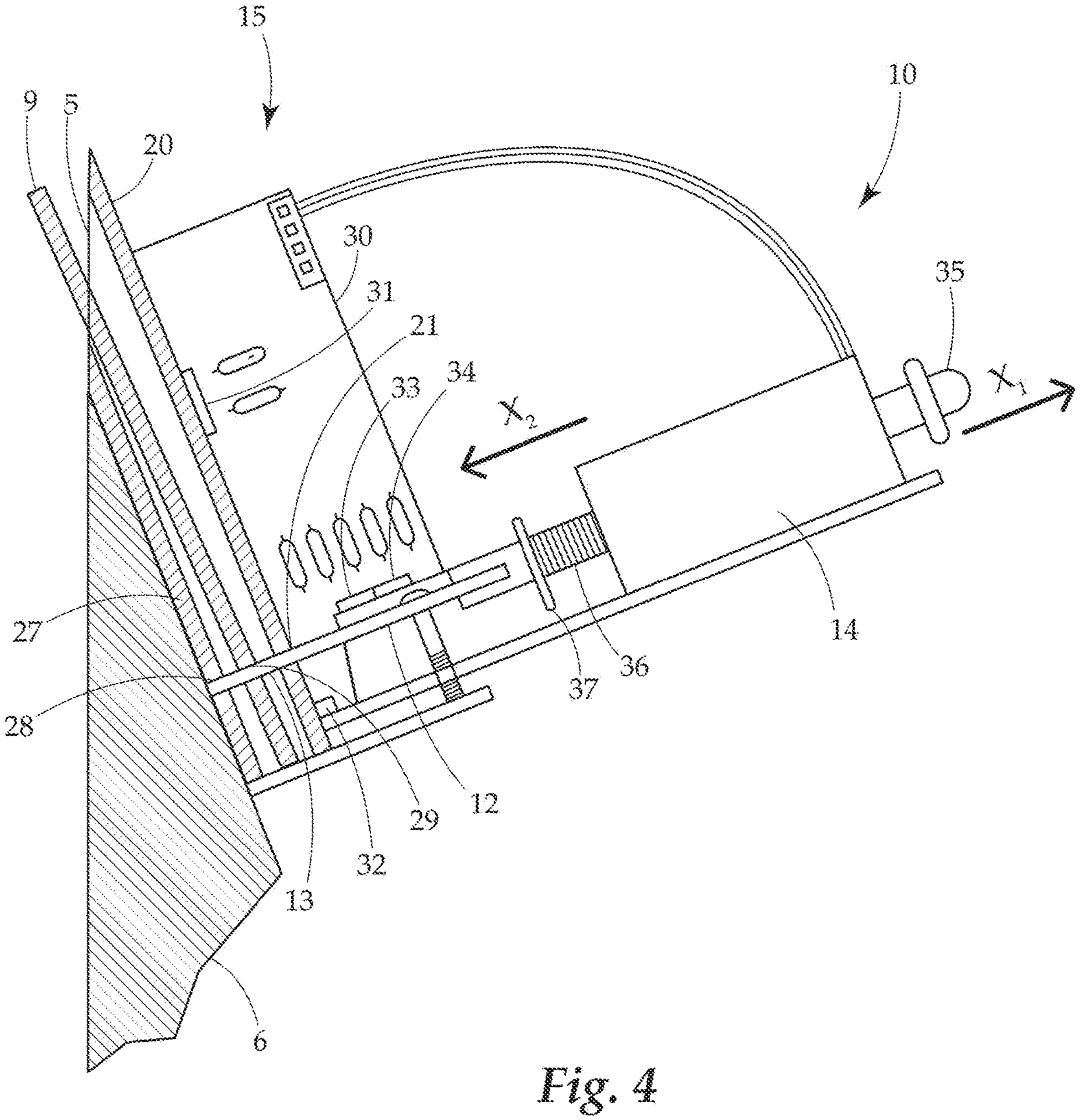
FIG. 4 provides a cross sectional perspective view of an embodiment of a plate door according to the present disclosure.

Turning now to FIG. 4, which provides a cross sectional perspective view of an embodiment of the plate door 6 that will be used to illustrate how a locking mechanism 10 functions to reciprocally lock and unlock a dealer plate 9 housed in a slot 5. In this embodiment, the locking jig 12 connected to the solenoid actuator 14 is extended in a locked position. When the locking jig 12 is extended in a locked position, the locking pins 13 penetrate: (1) a first set of apertures 21 defined in a first support sheet 20; (2) a set of holes 29 defined in the dealer plate 9; and (3) a second set of apertures 28 defined in a second support sheet 27. The purpose of the two support sheets 20 and 27 is to prevent the locking pins 13 from being bent in the event that a user attempts to remove the dealer plate 9 from the slot 5 before the locking jig 12 has completely retracted to an unlocked position.

In order for the locking jig 12 to retract to an unlocked position, an electric voltage must be applied to a solenoid coil located inside the interior of the solenoid actuator 14. In this embodiment, and still referring to FIG. 4, a voltage being applied to the solenoid actuator 14 causes an electromagnetic piston 35 partially housed within the solenoid actuator 14 to be repulsed in the $X_1$ direction, which in turn causes the locking jig 12 to retract to an unlocked position due to the connection between the locking jig 12 and the piston 35. When the locking jig 12 is retracted in the $X_1$ direction by the solenoid actuator 14, the locking pins 13 also retract and no longer penetrate the first set of apertures 21, the second set of apertures 28, or the holes 29 of the dealer plate 9. Accordingly, the retraction of the locking jig 12 allows the dealer plate 9 to be removed from the slot 5.

Either before or after the dealer plate 9 is returned to the slot 5, the locking jig 12 may be re-extended to a locked position. For example, and still referring to FIG. 4, when the electromagnetic piston 35 is repulsed in the $X_1$ direction, the repulsion of the electromagnetic piston 35 also causes a spring platform 37 connected to a proximal end of the electromagnetic piston 35 to compress a spring 36 in the same direction. The compression of the spring 36 is caused by the fact that the electromagnetic repulsion force created by the solenoid actuator 14 is greater than a spring displacement force, which opposes the compression of the spring 36. When an electric voltage is no longer being applied to the solenoid actuator 14, the electromagnetic repulsion force will disappear, and the spring displacement force will cause the spring 36 to extend and push the spring platform 37 in the $X_2$ direction. This causes the locking jig 12 to extend in the same direction to a locked position.

The mechanisms described in the preceding paragraphs describes how a locking mechanism 10 functions to reciprocally lock and unlock a dealer plate 9 housed in a slot 5. This paragraph describes how the sensor array 15 functions to determine and report the position of the locking jig 12 and the dealer plate 9 to the system. In this embodiment, and still referring to FIG. 4, the senor array 15 comprises a printed circuit board ("PCB") 30 having a plurality of sensors mounted thereon. In this embodiment, the sensors are proximity sensors that are operable to detect a target that is a certain distance from the sensor. In other embodiments, different types of sensors may be utilized, but in this embodiment, for example, a first sensor 31 and a second sensor 32 are operable to determine whether a dealer plate 9 is housed in a slot 5 associated with the locking mechanism 10. The first sensor 31 is operable to send a "plate out, lock slot" signal to the system when deactivated, and the second sensor 32 is operable to send a "plate in, lock slot" signal when activated. Similarly, a third sensor 33 and a fourth sensor 34 are operable to determine whether the locking jig 12 is in locked or an unlocked position and then send a corresponding signal reporting the position of the locking jig 12 to the system.

In most embodiments, and no longer referring to any specific figure, the sensor array connects the locking mechanism to the system. In some embodiments, the sensor array may connect the locking mechanism to the system by a wireless connection with a wireless transceiver located on the PCB for the sensor array. In other embodiments, the sensor array may connect the locking mechanism to the system by a wired connection with an ethernet port also located on the PCB for the sensor array. Regardless of what type of connection is utilized between the plate box and the system, the connection may allow the various sensors located on the sensor array to report information about the status of a dealer plate or the position of a locking mechanism to the system. Accordingly, the system may be operable to save this information in a database and/or a computer memory. The system may also be operable to communicate this stored information to a user interface display, such as a website or an application, as described further herein.

Figure 5:
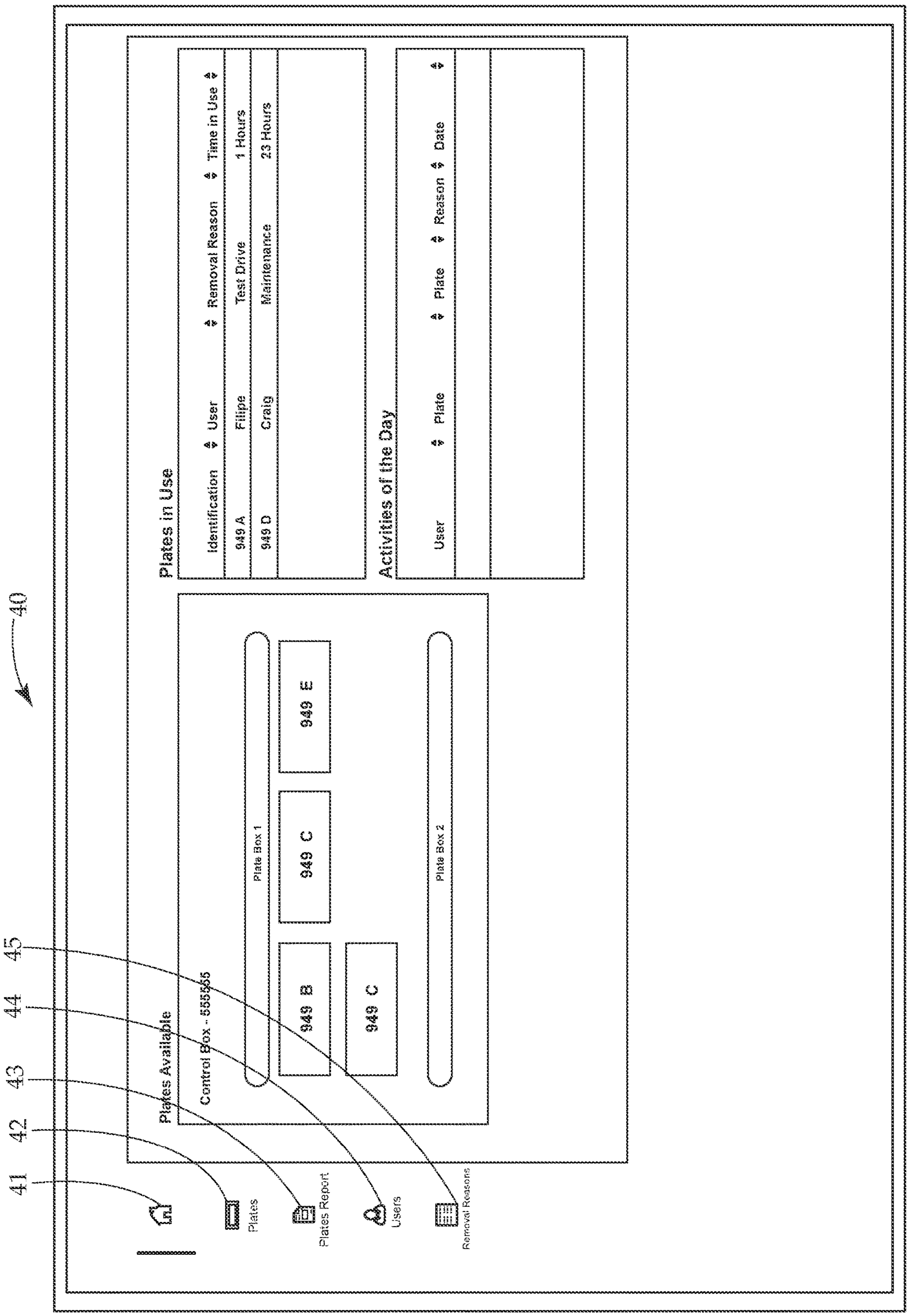
FIG. 5 provides a perspective view of an embodiment of a user interface according to the present disclosure.

Turning now to FIG. 5, which provides a perspective view of an embodiment of a user interface according to the present disclosure. In this embodiment, the user interface for a website 40 is displayed, and the website 40 is operable to access information regarding the system and stored in at least one of a database or a computer memory through a network connection. For example, in this embodiment, the website 40 is operable to display a home screen 41, which shows the status of dealer plates previously registered through a control box. The status of a dealer plate may comprise information regarding the plate box where the plate is located or whether the plate is currently in use. For a plate or plates that are in use, the website 40 is also operable to display in regarding the user who removed the plate, the reasons for the user's removal of the plate, and the amount of time the plate has been in use.

As shown in FIG. 5, the website 40 also is operable to display tabs other than the home screen 41. Accordingly, in this embodiment, the website 40 is operable to display additional information on additional tabs. For example, a plates tab 42 displays information regarding plates that are registered in the system. In this embodiment, the website 40 is operable to add or remove (i.e., register or unregister) plates to be secured with a plate box, and the website 40 is further operable to display this information on the plates tab 42. The website 40 is operable to display information regarding logs of user interactions with plates over a certain period of time on a plates report tab 43. In this embodiment, the website is operable to request and receive such information from at least one of a database or a computer memory via the system servers.

In this embodiment, and still referring to FIG. 5, the website 40 is operable to create a user profile for users, such as an owner or employees of a dealership, that will be interacting with the plates and the system. In this embodiment, before a user registers his or her fingerprint at a control box, a user profile for the user must be created. The website 40 is operable to display a list of user information on a user tab 44. The website 40 is also operable to remove or delete a user profile information, including a user's fingerprint information, which will cause the user to lose access to the plates secured by the plate box system. Furthermore, in this embodiment, the website 40 is also operable to display reasons for the removal of a plate from the plate box in a removal reasons tab 45. The website 40 is operable to display a preset list of removal reasons, but the website 40 is also operable to add or remove reasons for removal to the list.

Figure 6:
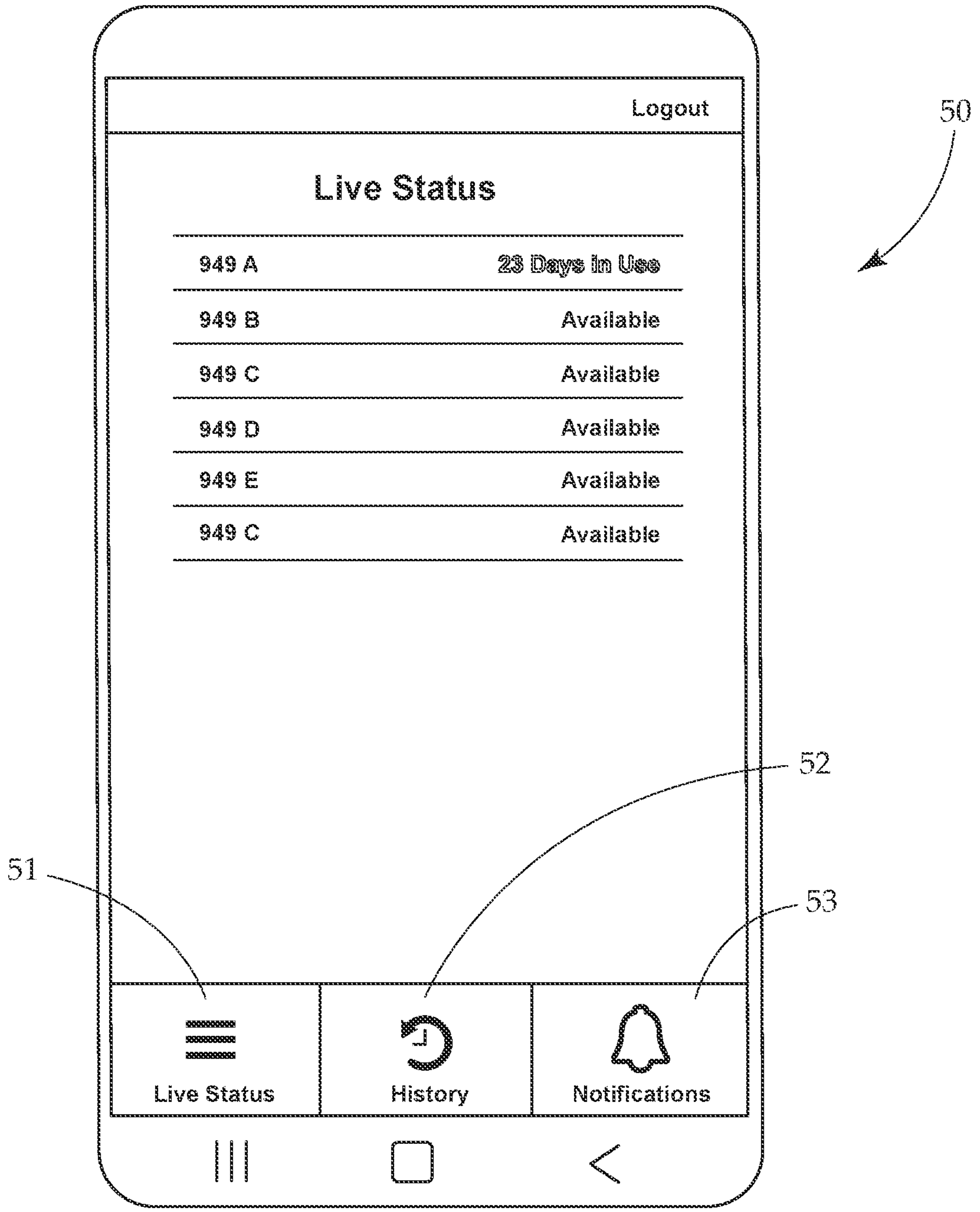
FIG. 6 provides a perspective view of another embodiment of a user interface according to the present disclosure.

Turning now to FIG. 6, which provides a perspective view of another embodiment of a user interface according to the present disclosure. In this embodiment, the user interface for an application 50 is displayed, and the application 50 is operable to access information regarding the system in a similar way to how the website 40 interfaces with the system (i.e., by a wired or wireless network connection). In a preferred embodiment, the user interface for the application 50 is displayed on a mobile device, such as a tablet or cellular phone. In the embodiment shown in FIG. 6, the application 50 is operable to display the status of active plates in a live status tab 51. Similar to the plates report tab 43 for the website 40, the application 50 is also operable to display information regarding logs of user interactions with plates over a certain period of time on a history tab 52. Finally, the application 50 is operable to receive inputs from a user to determine whether or when the user wishes to receive push notifications. The application 50 is operable to display information regarding said push notifications on a notifications tab 53.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements and/or user interfaces described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth.

What is claimed is:

1. A system comprising:

a control box;

a plate box connected to the control box, the plate box defining a slot on a front face of a plate door connected to the plate pox; and a locking mechanism attached to a rear face of the plate door, wherein the locking mechanism is operable to reciprocally lock and unlock an item placed in the slot.

2. The system of claim 1 wherein the control box comprises a touch screen and a fingerprint sensor attached to the control box.

3. The system of claim 1 wherein the plate box further comprises an LED indicator attached to the front face of the plate door, wherein the LED indicator is operable to glow green when the locking mechanism is unlocked and further operable to glow red when the locking mechanism is locked.

4. The system of claim 1 wherein the plate box comprises a top piece, a middle piece, and a bottom piece, wherein the top piece, the middle piece, and the bottom piece are welded together, and the plate door is hingedly connected to the middle piece.

5. The system of claim 1 wherein the locking mechanism comprises a solenoid actuator.

6. The system of claim 5 wherein the locking mechanism further comprises a locking jig attached to the solenoid actuator.

7. The system of claim 5 wherein the locking mechanism further comprises a sensor array electrically connected to the solenoid actuator.

8. The system of claim 7 wherein the sensor array comprises a PCB and a plurality of sensors attached to the PCB.

9. The system of claim 1 wherein the item placed in the slot is a license plate.

10. A system comprising:

a system server;

a control box in networked communication with the system server;

a plate box connected to the control box, the plate box defining a slot on a front face of a plate door connected to the plate box;

a locking mechanism attached to a rear face of the plate door, wherein the locking mechanism is operable to reciprocally lock and unlock a license plate placed in the slot;

a processor; and a non-transitory computer readable medium, wherein the non-transitory computer readable medium is configured to store instructions executable by the processor to conduct the steps of:

receiving a biometric information for a user from the control box; and saving the biometric information in the non-transitory computer readable medium or a database stored on the system server.

11. The system of claim 10 wherein the control box comprises a touch screen and a fingerprint sensor attached to the control box.

12. The system of claim 10 wherein the plate box further comprises an LED indicator attached to the front face of the plate door, wherein the LED indicator is operable to glow green when the locking mechanism is unlocked and further operable to glow red when the locking mechanism is locked.

13. The system of claim 10 wherein the plate box comprises a top piece, a middle piece, and a bottom piece, wherein the top piece, the middle piece, and the bottom piece are welded together, and the plate door is hingedly connected to the middle piece.

14. The system of claim 10 wherein the locking mechanism comprises a solenoid actuator.

15. The system of claim 14 wherein the locking mechanism further comprises a locking jig attached to the solenoid actuator.

16. The system of claim 14 wherein the locking mechanism further comprises a sensor array electrically connected to the solenoid actuator.

17. The system of claim 16 wherein the sensor array comprises a PCB and a plurality of sensors attached to the PCB.

18. The system of claim 10 wherein the system further comprises at least one of a website or an application, wherein the processor is further operable to conduct the step of displaying user interface for the website or the application on a screen.

19. A method of securing license plates, the method comprising the steps of:

providing a system for securing license plates, the system comprising:

a control box, wherein the control box comprises a touch screen and a fingerprint sensor attached to the control box;

a plate box connected to the control box, the plate box defining a slot on a front face of a plate door connected to the plate box; and a locking mechanism attached to a rear face of the plate door, wherein the locking mechanism is operable to reciprocally lock and unlock a license plate placed in the slot;

wherein the method further comprises the steps of:

scanning a thumb or a finger on the fingerprint sensor attached to the control box; and removing a license plate from the slot.

20. The method of claim 19 further comprising the steps of:

interacting with the touch screen attached to the control box; and returning the license plate to the slot.

* * * * *